US005388207A

United States Patent [19]

Chia et al.

[11] Patent Number: 5,388,207

[45] Date of Patent: Feb. 7, 1995

[54] ARCHITECUTRE FOR A WINDOW-BASED GRAPHICS SYSTEM

[75] Inventors: Wei K. Chia; Bor C. Kuo, both of Hsinchu; Jiunn M. Ju, Tainan County; Gen H. Chen, Hsinchu, all of Taiwan, Prov. of China

[73] Assignee: Industrial Technology Research Institute, Hsinchu, Taiwan, Prov. of China

[21] Appl. No.: 796,720

[22] Filed: Nov. 25, 1991

[51] Int. Cl.[6] .................................... G06F 15/62

[52] U.S. Cl. .................................... 395/164; 395/162; 395/400

[58] Field of Search ............... 395/162, 164, 166, 400, 395/425

[56] References Cited

U.S. PATENT DOCUMENTS

| | | | |
|---|---|---|---|
| 4,791,580 | 12/1988 | Sherrill et al. | 395/164 |
| 4,985,848 | 1/1991 | Pfeiffer et al. | 395/164 |
| 5,046,023 | 9/1991 | Katsura et al. | 395/162 |
| 5,047,958 | 9/1991 | Comins et al. | 395/166 |
| 5,142,621 | 8/1992 | Guttog et al. | 395/164 |

OTHER PUBLICATIONS

Wescon Technical Papers, (1984) Oct. 1930–Nov. 2, "Graphics Display Processor to Integrate Drawing Algonthon and Display Controls", Katsura et al. pp. 1–8.

*Primary Examiner*—Mark R. Powell
*Assistant Examiner*—Kee M. Tung
*Attorney, Agent, or Firm*—Meltzer, Lippe, Goldstein, Wolf, Schlissel and Sazer

[57] ABSTRACT

A computer graphics system comprises a main CPU, a main system memory and a graphics subsystem for displaying graphical images on a display terminal. A system bus enables the main CPU, main system memory and graphics subsystem to transmit data among one another. The graphics subsystem comprises a graphics controller in communication with the system bus, a frame buffer for storing pixels displayed on the display terminal, and a separate off-screen memory unit located within the graphics subsystem for storing off-screen pixels in a linear format. A local bus is included in the graphics subsystem for transmitting data within the graphics subsystem among the frame buffer, the off-screen memory and the graphics controller. The graphics controller includes an address processing unit for converting between two-dimensional addresses and linear format addresses utilized by the off-screen memory unit. In the inventive computer graphics system address conversions required for executing graphical operations and block swaps between the off-screen memory and the frame buffer are performed in the graphics controller rather than in the main CPU. Thus, the inventive graphics system makes more efficient use of CPU resources than a conventional architecture.

12 Claims, 9 Drawing Sheets

ARCHITECUTRE FOR A WINDOW-BASED GRAPHICS SYSTEM

RELATED CASE

An application entitled "Address Processing Unit for a Graphics Controller" has been filed for the inventors hereof on even date herewith and is assigned to the assignee hereof. The related case bears Ser. No. 07/796,719, and issued on Oct. 19, 1993 as U.S. Pat. No. 5,255,366.

1. Field of the Invention

The present invention relates to an architecture for a graphics system with a window based interface. The invention also relates to a graphics controller including a unique address processing unit for use in the graphics system.

2. Background of the Invention

In today's computer world, it is very important to provide an intimate man-machine interface. The window-based system is an example of such an interface. The window-based computer interface system has become very popular in the last few years because of its simplicity and friendliness.

A conventional graphics system which utilizes a window-based interface system is illustrated in FIG. 1.

The system 10 of FIG. 1 comprises a CPU 12, a main system memory 14, a disk memory 16 and a graphics subsystem 18. All of these elements communicate with one another via the system bus 20.

The graphics subsystem comprises the graphics controller 30, the frame buffer 32, the digital-to-analog converter (DAC) 34, and the raster scan display device 36 which illustratively is a CRT display device. The graphics controller 30 generates CRT control signals via lines 37 for controlling the display device 36 so that images can be displayed. The CRT control signals include horizontal synchronous signals, vertical synchronous signals, horizontal and vertical blanking signals, etc.

The frame buffer 32 is comprised of video RAMs (VRAMs) 33. These VRAMs store the pixels which are displayed on the display device 36.

The graphics controller 30 transmits addresses and control signals via lines 38 to the frame buffer 32 to perform screen refresh operations. Pixels located at the addresses received from the graphics controller 30 are read out from the frame buffer 32 on line 36 in serial form. A display control circuit which is formed by the digital-to-analog converter 34 mixes the pixels read out of the frame buffer on line 36 with the control signals on line 37 to produce an analog signal suitable for use by the display terminal 36.

The graphics controller can also transmit data via the bus 39 to the frame buffer to change the content of the image displayed on the screen. This data can be retrieved from the disk system 16 or the system memory 14. Alternatively, this data can be generated by the CPU 12 or be generated by graphics processing operations performed inside the graphics controller 30 in response to commands issued by the CPU 12.

In the case of a window-based graphics system, some space is usually set aside in the main system memory 14 to serve as an off-screen memory or PIXMAP. The use of the off-screen memory varies depending on the application. One application of the off-screen memory is as follows. When a window interface is utilized, multiple overlapping windows are often displayed on a screen.

The occluded, i.e. overlapped and thus non-visible, portions of these windows may be stored in the off-screen memory. In a conventional graphics system, such as the system 10 of FIG. 1, the off-screen memory is formed by part of the main memory system. In different applications, the images or image portions stored in the off-screen memory may be processed in accordance with various graphic processing algorithms, e.g., drawing lines, circles, or making a block transfer. In a block transfer, a block of pixels of a window or window portion stored in the off-screen memory is swapped with a corresponding block of pixels in the frame buffer, so as to reverse the overlapping relationship of two windows (i.e., whereas before the swap window A overlaps window B, after the swap window B overlaps window A).

In a graphics system, pixels are viewed in a two-dimensional format, wherein each pixel has an address comprising an X coordinate and a Y coordinate. FIG. 2A shows a portion of a window wherein the pixels are arranged in this two-dimensional format. In FIG. 2A, the window portion has a width measured in pixels equal to WD and each line of pixels is labeled 0, 1, 2, . . . , n. On the other hand, pixels comprising a window or window portion are stored in the off-screen memory in a linear format as shown in FIG. 2B. Starting from a base address the rows of pixels of the window of FIG. 2A are stored one after the other, i.e., row 0 followed by the row 1, which is followed by the row 2, etc. The advantage of the linear format is that memory space is efficiently utilized.

However, in order to perform graphics processing on the pixels stored in the off-screen memory, it is often necessary to convert between two dimensional, i.e., X, Y, addresses and linear addresses. This conversion is done in accordance with the following equation:

$$\text{Linear Address} = \text{BASE ADDRESS} + Y.WD + X \quad (1)$$

In equation (1), X, Y define the two dimensional address, WD is the width of the window or window portion in the two dimensional format, and BASE ADDRESS is the initial linear address.

The foregoing equation involves a multiplication operation. The conventional graphics controller 30 of FIG. 1 cannot perform this multiplication operation. Therefore in the system 10 of FIG. 1, this multiplication has to be performed by the CPU 12. This reduces the bandwidth of the system 10 of FIG. 1 and the overall efficiency of the system is decreased.

A further problem with the system 10 of FIG. 1 occurs when a block of pixels is swapped between the off-screen memory (i.e., the main system memory 14) and the on-screen memory (i.e., the frame buffer 32). This may be done for example to reverse the overlapping relationship of two windows. This operation also has to be executed by the CPU further decreasing the efficiency of the system.

In view of the foregoing, it is an object of the present invention to provide a system architecture and graphics controller which overcome the shortcomings of the conventional system architecture and graphics controller discussed above. In particular, it is an object of the present invention to provide a system architecture and graphics controller in which two-dimensional to linear address conversions and pixel block swaps between off-screen and on-screen memory are not performed by the main CPU, but instead are performed by the graphics controller, to increase overall system efficiency by making better use of available CPU resources. It is also an object of the invention to provide an address processing unit for use in the graphics controller for converting between two-dimensional and linear addresses.

SUMMARY OF THE INVENTION

In a preferred embodiment, the present invention is a computer graphics system which comprises a main CPU, a main system memory, and a graphics subsystem for displaying graphical images on a display terminal. The main CPU, the system memory, and the graphics subsystem transmit data among themselves via a system bus.

The graphics subsystem comprises a graphics controller in communication with the system bus and a frame buffer for storing pixels displayed on the display terminal. A separate off-screen memory unit is located within the graphics subsystem for storing off-screen pixels in a linear format. The graphics subsystem includes its own local bus for transmitting data within the graphics subsystem among the frame buffer, off-screen memory unit and the graphics controller.

The graphics controller includes a unique address processing unit for processing addresses generated by a raster operation unit in the graphics controller, addresses generated by the host CPU, and screen refresh addresses. In particular, the address processing unit includes a circuit for converting between two-dimensional addresses generated by the raster operation unit and linear addresses utilized by the off-screen memory unit.

The inventive graphics system architecture including the unique address processing unit realizes several significant advantages which are not realizable in a conventional graphics system architecture:

1) The efficiency of the whole system is increased. The main CPU is no longer involved in two-dimensional to linear address conversions and data transfers between the off-screen memory and the frame buffer. Thus, the inventive system makes more efficient use of CPU resources.

2) The speed of execution of a graphics command is increased through use of the address processing unit in the graphics controller.

DETAILED DESCRIPTION

Figure 1:
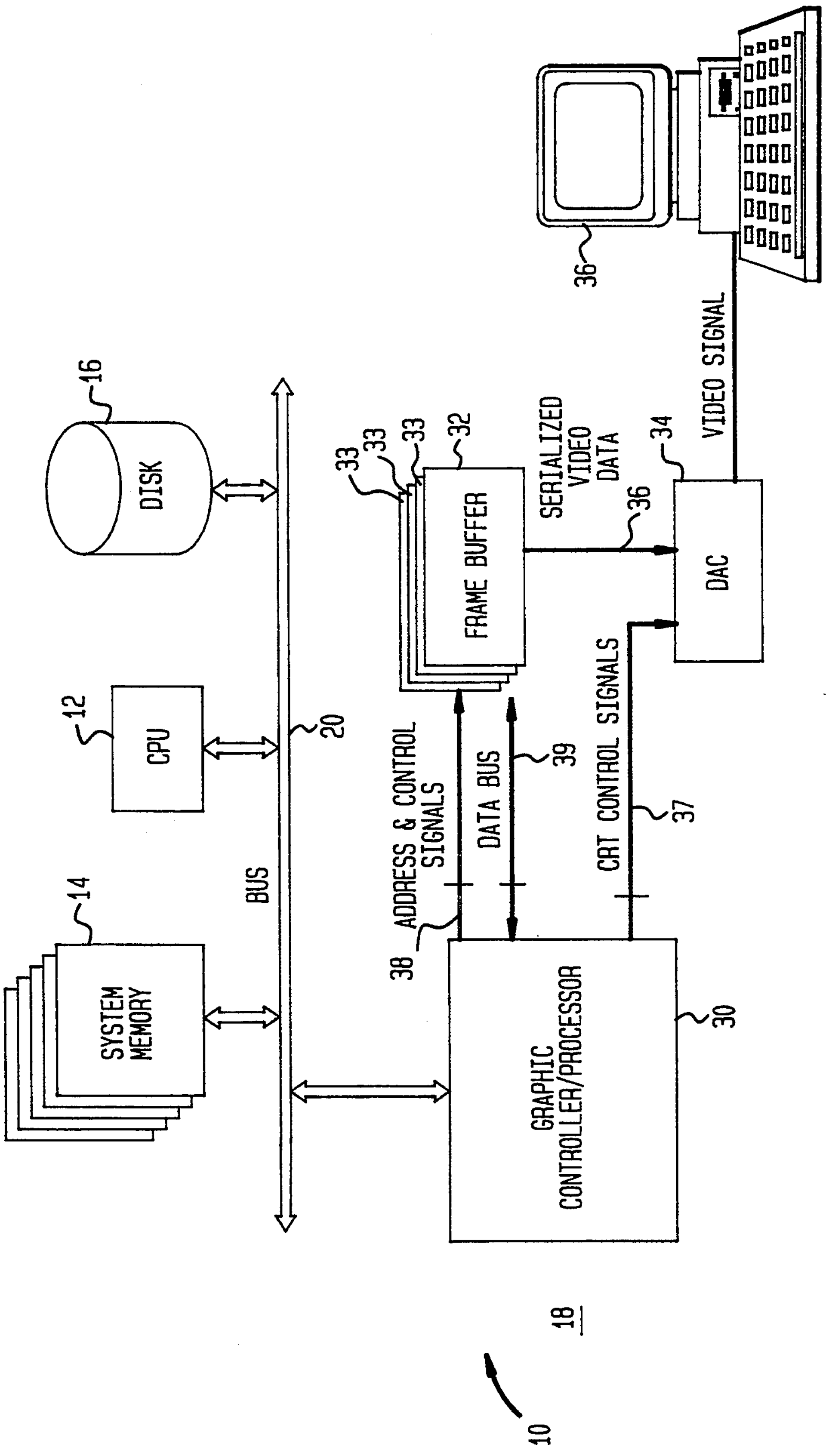
FIG. 1 (PRIOR ART)
FIG. 1 illustrates a conventional computer system with graphics capability.
Figures 2A, 2B:
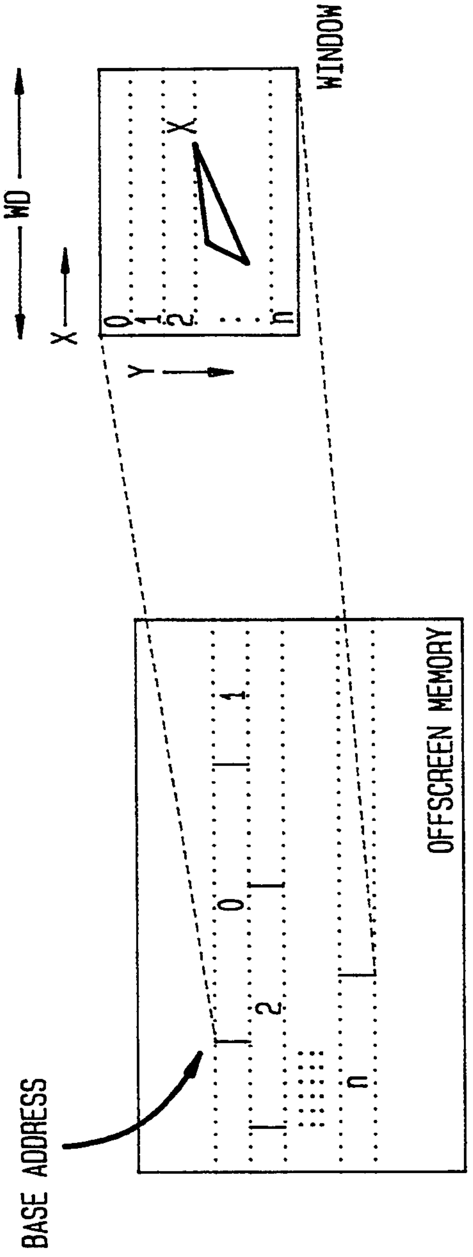
FIGS. 2A and 2B illustrate the two-dimensional and linear address formats.
Figure 3:
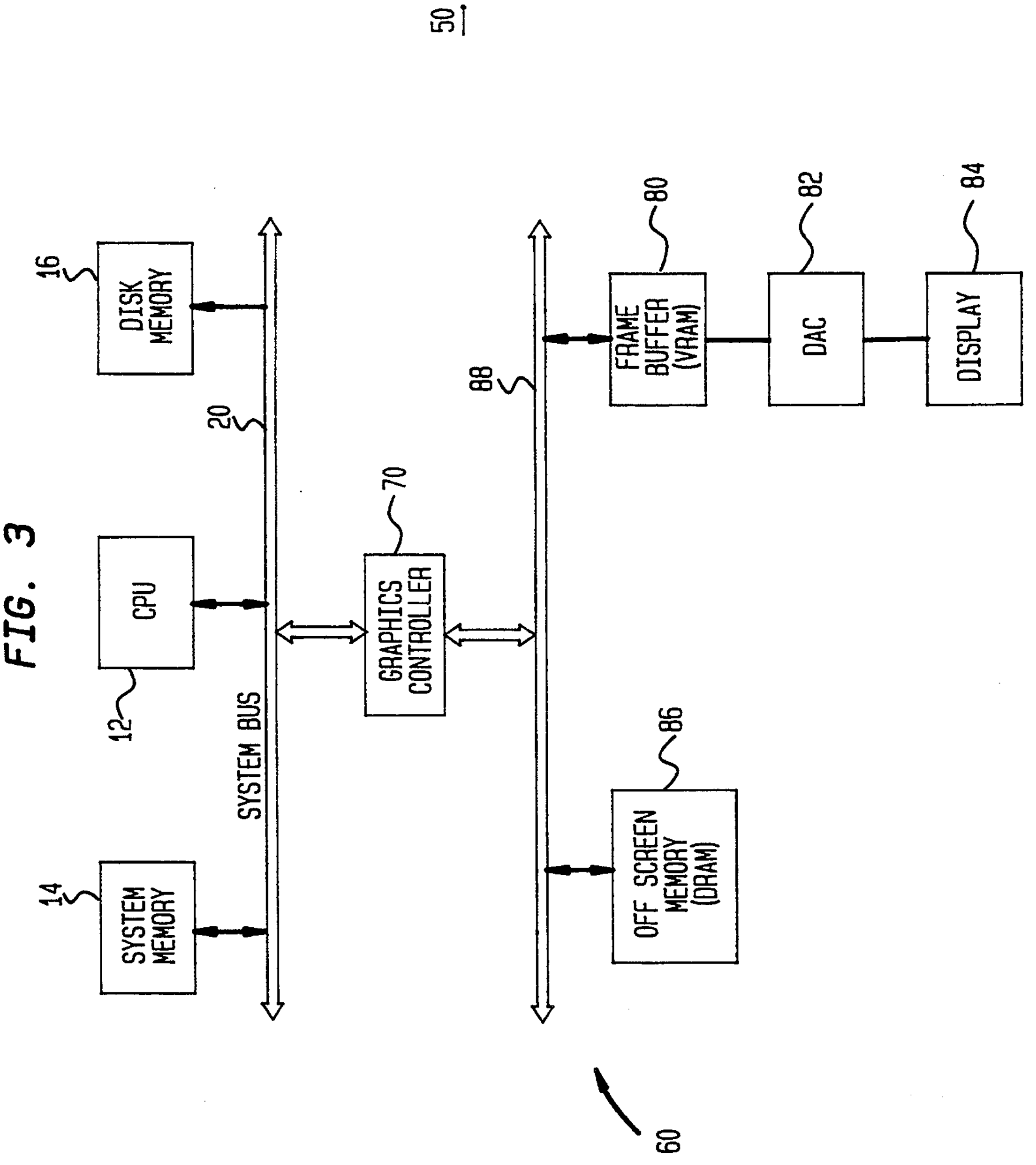
FIG. 3 illustrates a computer system with graphics capability in accordance with an illustrative embodiment of the present invention.

A graphics system 50 in accordance with the present invention is illustrated in FIG. 3. Like the conventional system 10 of FIG. 1, the system 10 includes a main CPU 12, a main system memory 14 and a disk memory 16, all interconnected by a system bus 20. Also connected to the system bus 20 in the system 50 of FIG. 3 is the graphics subsystem 60. The graphics subsystem 60 comprises the graphics controller 70 which is in communication with the system bus 20. The graphics subsystem 60 also includes the frame buffer 80 which is connected via the digital-to-analog converter 82 to the CRT display terminal 84. As indicated above, the frame buffer stores pixels which are displayed on the display terminal 84.

The graphics display subsystem 60 also includes the separate off-screen memory 86. The off-screen memory 86 stores pixels which are not currently displayed on the display terminal 84, for example, the pixels comprising overlapped portions of windows. The off-screen memory 86 stores pixels using a linear format to make efficient use of available memory capacity. The frame buffer 80 may be implemented by one or more VRAM units and the off-screen memory 86 may be implemented by one or more DRAM units.

The graphics subsystem 60 also includes the local bus 88 to which the graphics controller 70, the frame buffer 80 and the off-screen memory 86 are connected.

Figure 4:
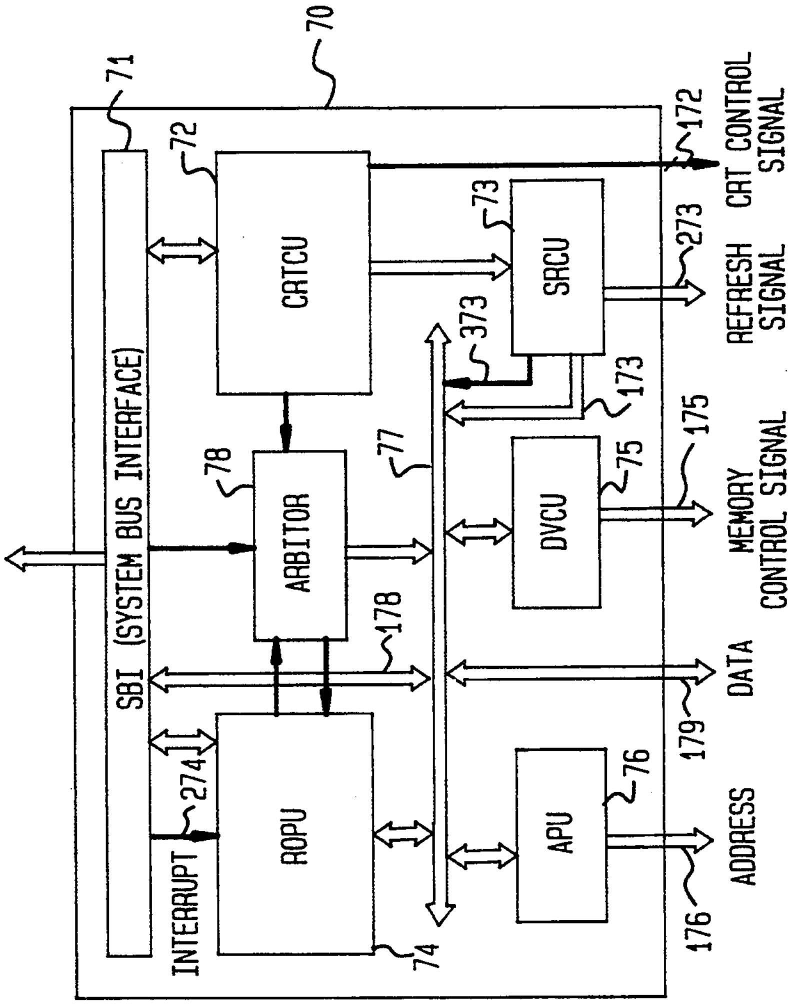
FIG. 4 illustrates a graphics controller for use in the system of FIG. 3 in accordance with the present invention.

The graphics controller 70 utilized in the inventive system 50 of FIG. 3 is illustrated in greater detail in FIG. 4. As is shown below, the graphics controller 70 of FIG. 3 and FIG. 4 differs from the conventional graphics controller 30 of FIG. 1 primarily in that it contains a unique address processing unit. The address processing unit includes a circuit for converting between two-dimensional and linear addresses.

More specifically, the graphics controller 70 includes a System Bus Interface (SBI) 71 for interfacing the controller with the system bus 20 of FIG. 3. The graphics controller 70 also includes a CRT control unit (CRTCU) 72 for generating control signals for the CRT display unit on lines 172, including horizontal and vertical sync signals and horizontal and vertical blanking signals. The graphics controller 70 also includes a screen refresh control unit (SRCU) 73 for generating refresh control signals so that the display may be refreshed repeatedly to avoid flicker. The refresh control signals include screen refresh addresses on line 173 and a load clock for the DAC 82 and a serial clock for the frame buffer 80 on lines 273. The serial clock connects, for example, to the "SC" pins of the VRAMs used to implement the frame buffer 80. The SCRU also generates a screen refresh request on line 373 for use by the arbiter 78.

The raster operation unit (ROPU) 74 executes graphics commands such as pixel block transfer, pixel processing, plane masking, etc. Additionally, in a window-based system, the ROPU 74 performs window processing functions such as window clipping, etc.

As indicated above, the graphics subsystem includes a frame buffer 80 implemented using VRAMs and an off-screen memory unit 86 implemented using DRAMs. To control these VRAMs and DRAMs the graphics controller includes a DRAM and VRAM control unit (DVCU) 75. The DVCU 75 generates control signals on line 175 for accessing pixels stored in the frame buffer 80 and off-screen memory 86. The DVCU 75 is virtually identical in construction to the VRAM control circuit found in the conventional graphics controller 30 of FIG. 1 for accessing the frame buffer.

The graphics controller 70 also includes an address processing unit (APU) 76 for performing address processing. The APU 76 is discussed in greater detail below. The SBI 71, CRTCU 72, SRCU 73, ROPU 74, DVCU 75, and APU 76 communicate via an internal bus 77.

In the system illustrated in FIG. 3 and FIG. 4, the frame buffer 80 may be accessed by a plurality of masters including the host CPU 12 (FIG. 3), the ROPU 74 (FIG. 4), the DVCU 75 and the SRCU 73. In general, there is only one access channel for the frame buffer. To avoid conflicts between the various masters in accessing the frame buffer, the graphics controller 70 includes the arbiter 78. It should be noted that data can be transferred from the CPU 12, or the main system memory 14 or the disk memory 16 under the control of the CPU 16 to the off-screen memory 86 or frame buffer 80, via the system bus interface 71, the line 178, the internal bus 77, and the line 179. Similarly, data can be transferred from the ROPU 74 to the memories 86 or 80 via the internal bus 77 and the line 179.

The system illustrated in FIG. 3 and FIG. 4 operates generally as follows. The main CPU 12 transmits to the ROPU 74 a graphics command to be executed on the pixels in the off-screen memory 86 or on the pixels in the frame buffer 80. The ROPU 74 carries out the command while the main CPU accomplishes other tasks. When the ROPU 74 accomplishes the command, it will emit an interrupt signal on line 274, and the next graphics command will be transmitted to it. As a result of this structure, the main CPU 12 does not become involved in the detailed execution of most graphics commands and CPU resources are utilized more effectively. Furthermore, because the off-screen memory 86 is on the local bus 88, the graphics controller 70 can speedily complete transfers of pixel blocks between the frame buffer 80 and off-screen memory 86. This too can be accomplished without the use of the main CPU 12. As indicated above, the main CPU 12 can directly access the pixels in the frame buffer 80 or the off-screen memory 86 via the graphics controller 70. For example, when the off-screen memory 86 is full, it is possible to store additional off-screen pixels in the main system memory 14 under the control of the main CPU 12.

Figure 5:
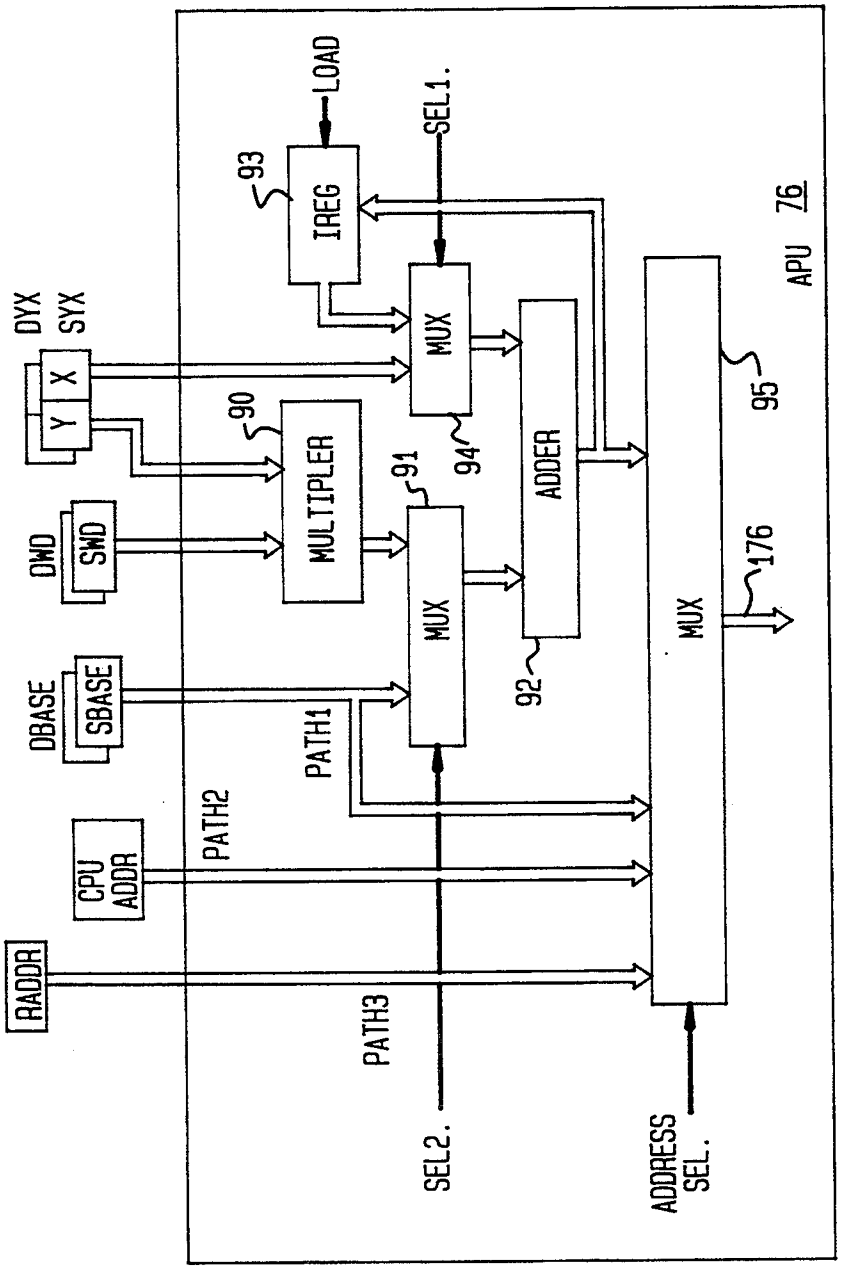
FIG. 5 illustrates an address processing unit for use in the graphics controller of FIG. 4 in accordance with the present invention.

The address processing unit 76 is now considered in greater detail. The address processing unit 76 is shown in greater detail in FIG. 5. The ROPU 74 (see FIG. 4) includes six registers SBASE, DBASE, SWD, DWD, SYX and DYX which are utilized by the address processing unit 76. These registers are shown in FIG. 5. The value of these registers are defined by the main CPU in accordance with a particular graphics command or by the ROPU itself. SBASE and DBASE represent the base linear address of the source and destination windows. SWD represents the distance (as measured in pixels) between two vertically adjacent points in a source window or window portion. DWD is similar in meaning to SWD except that it applies to the destination window. SXY and DXY store the X and Y coordinates of a pixel in the source window and destination window, respectively.

The meaning of the registers may be understood in greater detail by considering the following examples. In the graphics controller 70 of FIG. 4, drawing operations are performed by the ROPU 74. To execute graphics instructions, the ROPU 74 utilizes the operands stored in the SBASE, DBASE, SWD, DWD, SXY, DXY registers. The particular operands which are utilized by the ROPU 74 depend on the graphics command. For example, instructions which draw lines or curves need only be a drawn destination area. Thus, the operands for this type of command are established only in the destination registers DBASE, DWD, and DXY.

Figure 6:
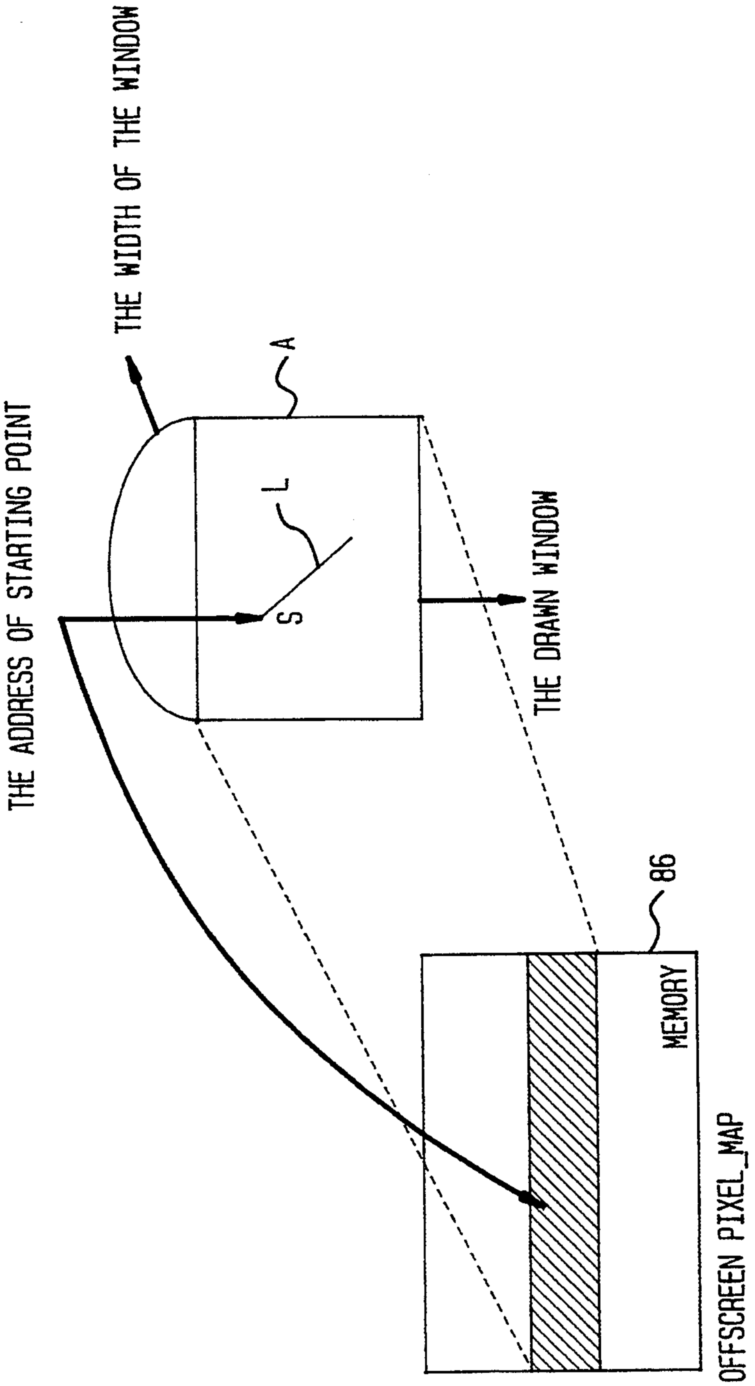
FIG. 6 and FIG. 7 illustrate operations performed by the graphics controller of FIG. 4 and address processing unit of FIG. 5.

FIG. 6 shows a window area A in the offscreen memory 86 of FIG. 3. An instruction is to be executed to draw the line L. To accomplish this instruction, the starting point of the line S of the line is initially programmed into the DBASE register, the window width is initially programmed into the DW register and zero is initially programmed into the DXY register. When the ROPU determines the first drawing point, the DXY register is updated automatically with the next drawing point.

It should be noted that in the system of FIG. 3, FIG. 4 and FIG. 5, offscreen memory 86 stores pixels using the linear address mode. On the other hand, the ROPU 74 generates addresses in a two-dimensional format while executing the instruction to draw a line L. The mapping between the window area A as represented in a two-dimensional format and the window A in the linear format of the offscreen memory 86 is schematically illustrated in FIG. 6. Therefore, to actually draw the pixels which form the line L in the window area A, the address of the pixels on the line L need to be translated from two-dimensional format generated by the ROPU to the linear format to actually access the offscreen memory. This address conversion is carried out by the APU 76 and is discussed in detail below.

Figure 7:
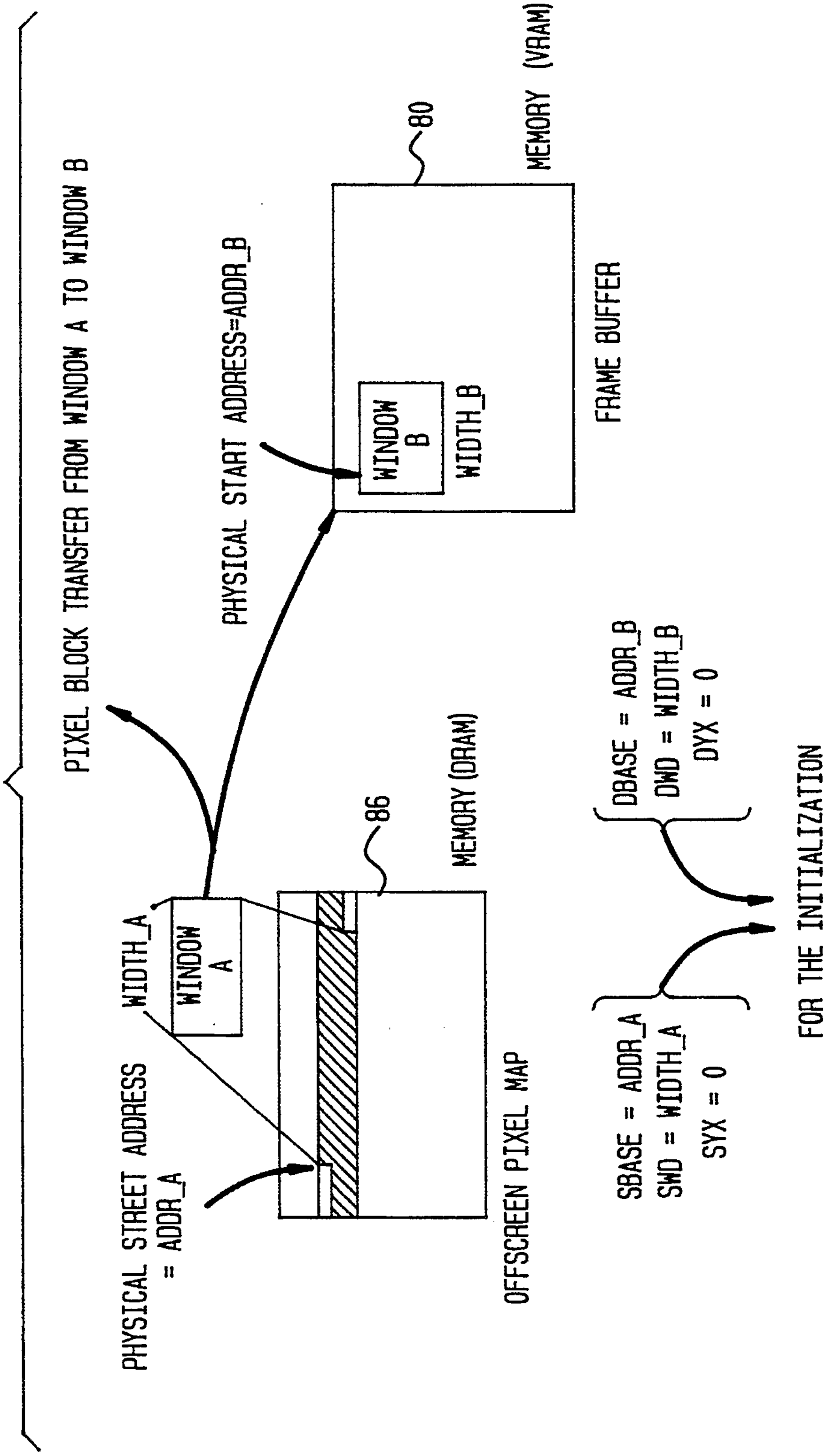

Another example is illustrated in FIG. 7. In FIG. 7 a block of pixels from the offscreen memory 86 designated window A is moved to the frame buffer 80, where the pixel block is designated window B. Two sets of operands are necessary to carry out this operation, one set for defining the source block area (window A) and another set for the destination block area (window B). When these operands are set up, the ROPU 74 moves the pixels in the source block in the offscreen memory 86 to the position of the destination block in the frame buffer 80. The source block operands for the window A are SBASE, SWD and SXY. The destination operands for the destination block are DBASE, DWD and DXY.

The setup of these registers is performed by the host CPU 12 (see FIG. 3) when the instruction is initiated. The registers are initiated as follows:

SBASE=ADDR A (start address for window A)
SWD=Width of window A
SXY=0
DBASE=ADDR B (start address of window B)
DWD=Width of window B
DYX=0

After the initial value of the registers is determined by the CPU 12, the values of the registers are updated by the ROPU 74 as each pixel is moved from window A to window B.

It should be noted that the pixels in the window A are stored in the offscreen memory 86 in a linear fashion as schematically shown in FIG. 8. Therefore it is necessary for the APU 76 to convert between the two dimensional addresses generated by the ROPU in executing the instruction and the linear addresses to actually access the pixels from the offscreen memory 86.

The operation to perform a two-dimensional to linear address conversion using the address processing unit 76 of FIG. 5 is now considered. The conversion process is suitable for both source and destination address conversion. The multiplier 90 multiplies Y*WD (i.e. SY*SWD or DY*DWD). The result of this multiplication is transmitted via the multiplexer 91 to the adder 92 which adds the value X to form the quantity Y*WD+X which is stored in the intermediate result register 93. The contents of the intermediate result register 93 are then transmitted via the multiplexer 94 to the adder 92. Also transmitted to the adder 92 via the multiplier 91 is the BASE ADDRESS. The adder 92 then outputs the linear address corresponding to X and Y. The linear address is then transmitted by the multiplexer 95 which outputs via lines 176 the final row and column address for the DRAMs of the off-screen memory 86 or the VRAMs of the frame buffer 80.

The address processing unit 76 performs other types of address processing in addition to two-dimensional to linear address conversion. For example, if the ROPU 74 directly generates linear addresses, only the SBASE register for the source window or DBASE register for the destination window is utilized. When the ROPU 74 executes its instructions in a linear space, the next pixel to be drawn is one of the two pixels immediately adjacent (i.e. on either side) of the current pixel. Therefore the address of the next pixel can be obtained by simply decrementing or incrementing the address of the current pixel. This can be performed simply by incremently or decremently the current address in SBASE or DBASE. Because the offscreen memory 86 also uses linear addresses, no address conversion is necessary. Instead, in the APU 76, the linear address in the SBASE or DBASE register is transmitted directly via path 1 to the multiplexer 95.

The path 2 of the APU 76 is utilized when the host CPU 12 (see FIG. 3) wishes to directly access the frame buffer 80 or the offscreen pixel memory 86. In this case, the host CPU 12 must store in the CPU ADDR latch the correct physical address of the pixel it desires to access in the offscreen memory 86 or frame buffer 80. Thus, if the CPU 12 wishes to access the offscreen memory 86 it must put a linear address in the CPU ADDR latch. If the CPU 12 wishes to access the frame buffer 80 it puts a two dimensional address in the CPU ADDR, assuming that the frame buffer utilizes the two-dimensional address format. The address in the CPU ADDR latch is then transmitted directly to the multiplexer 93.

The path 3 of the APU 76 is utilized for refresh addresses for refreshing the frame buffer 80. Illustratively, the frame buffer 80 utilizes two dimensional addressing. These two dimensional addresses are generated by the SCRU 73 (see FIG. 4) and transmitted to the RADDR latch. No address conversion is necessary. The refresh addresses are transmitted directly via path 3 from the RADDR to the multiplexer 95.

In general, the ROPU may be viewed as executing in a logical drawing space which can be either linear or two dimensional. As indicated above, when the ROPU executes in a linear drawing space, the position of the next pixel is one of the two pixels adjacent to the pixel just drawn. Thus, the address of the next pixel can be obtained by incrementing or decrementing the address of the current pixel by one. As indicated above, the SBASE or DBASE register can be utilized for this purpose. When the ROPU executes in a logical drawing space which is two-dimensional, the position of the next pixel to be processed is usually one of eight pixels adjacent to the current pixel. Thus, to update the pixel address in a two-dimensional space, the X coordinate increments or decrements by one position or remains the same and the Y coordinate is incremented or decremented by WD (SWD OR DWD) or remains the same.

There has already been considered the case where the logical drawing space of the ROPU is two-dimensional and where the physical address space of the memory is linear. There has also been considered the case where the logical drawing space of the ROPU is linear and the physical address space of the memory is also linear.

It is also possible to consider the case where the logical drawing space is two-dimensional and where the physical drawing space is also two-dimensional. This occurs when the physical drawing space is the frame buffer which utilizes a two-dimensional address format. In this case, the APU can be utilized to perform conversions between the two-dimensional addresses of the logical and physical drawing spaces.

If the original point of the logical drawing space is the same with the starting address of the frame buffer, the address transformation is easy. The base register (i.e. SBASE or DBASE) and IREG register are not employed. The width register (i.e. DWD or SWD) is programmed to the width of the frame buffer. The generation of the physical address only need some cycle and may be obtained by the path of Y*DWD(or SWD)+X in the APU. Finally, the row and column address can be generated by way of the multiplexer 95 and ADDRESS SEL signal (address selection control signal).

However, if the original point of the logical drawing space is different from the starting address of frame buffer, then the base register is utilized. Furthermore, the APU also needs two cycles to perform the address transformation. In the first cycle, Y*DWD(orSWD)+X is calculated and then stored into the IREG register. Afterward, the content of the IREG register is added together with the base register to obtain the final physical address.

The graphics controller selects between the above two modes according to the control bits (i.e. SEL1, SEL2, LOAD, and ADDRESSS SEL) of the APU 76.

Figure 8B:
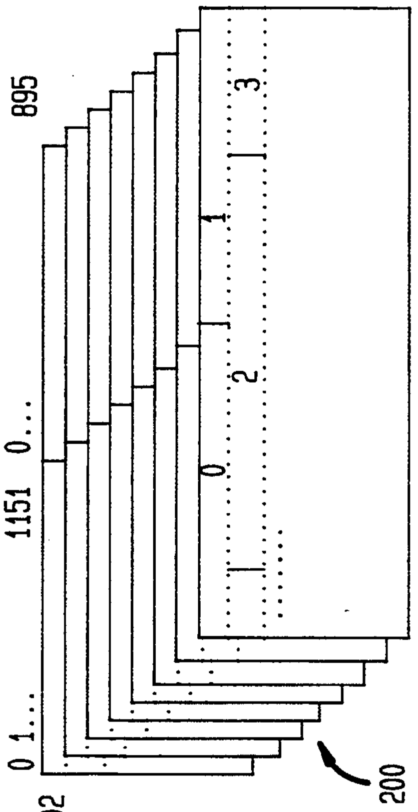
FIG. 8A and FIG. 8B illustrate a frame buffer which utilizes the two-dimensional and linear address formats, respectively.
Figure 8A:
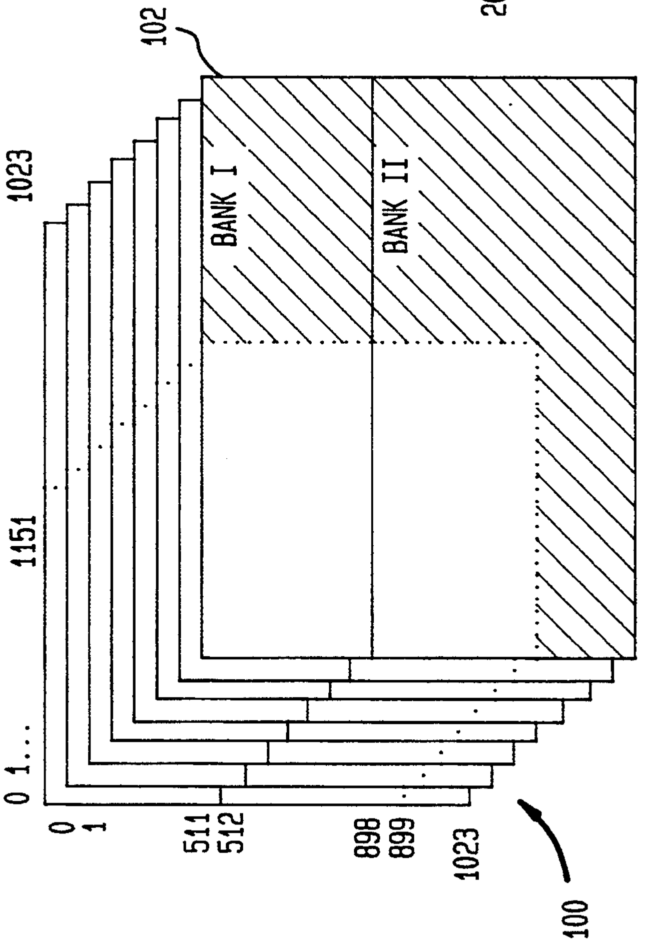

Because the graphics controller includes an address processing unit having the capability of converting between two-dimensional and linear addresses, it is possible to use a linear format in the frame buffer rather than the two-dimensional arrangement conventionally utilized in the frame buffer. FIG. 8A shows a frame buffer 100 comprising eight planes 102 for storing a frame of video having a resolution of 1152*900. Note that two banks (bank I and bank II) of 256k*4 VRAMs are utilized in FIG. 8A because a two-dimensional addressing arrangement is utilized and there is a lot of wasted memory space. The wasted memory space is indicated by the shading in FIG. 8A. FIG. 8B illustrates a frame buffer 200 for storing a frame of video having a resolution of 1152*900 and which utilizes 256*4 VRAMs to form each of eight planes. Note that only one bank of 256*4 VRAMs is required in FIG. 8B because linear addressing is utilized. Thus, in this example, linear addressing saves one bank of VRAMs.

Figure 9:
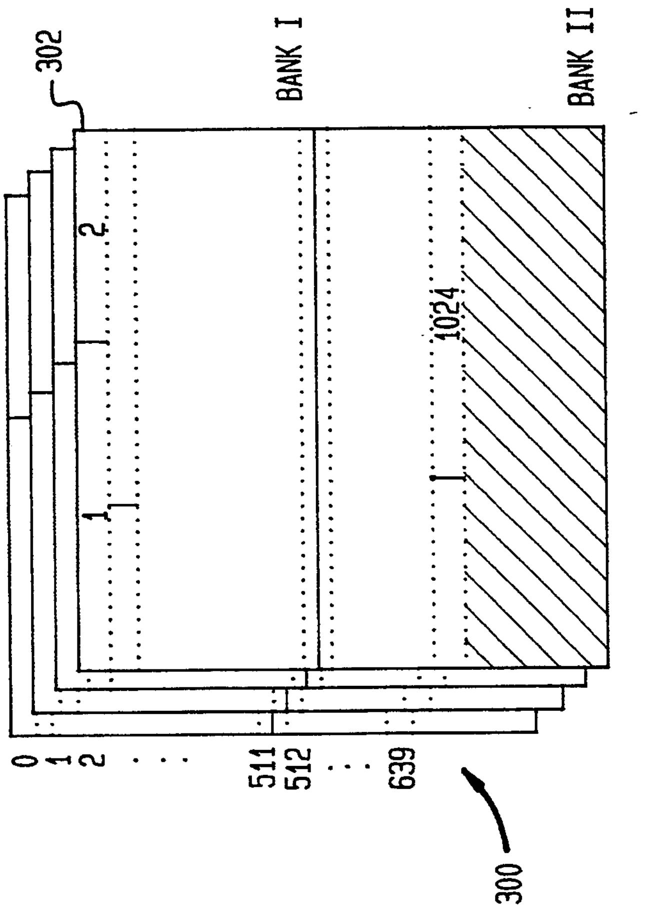
FIG. 9 illustrates a frame buffer which utilizes a linear address format and which has excess capacity for storing off-screen pixels.

In other cases, the introduction of linear addressing may result in excess frame buffer capacity. Since this excess capacity is continuous, it can be used to store off-screen pixels. If this capacity is sufficient for the off-screen memory requirements of a particularly system, the separate off-screen memory unit may be eliminated. For example, FIG. 9 shows a frame buffer 300 which stores a frame of video having a resolution of 1280*1024. The frame buffer 300 comprises four planes 302. Each of the planes 302 is formed from 256k*4 VRAMs and two banks (Bank I and Bank II) of the VRAMs are required. The excess capacity which may be utilized for off-screen pixels is indicated by the shading in FIG. 9.

Finally, the above-identified embodiments of the invention are intended to be illustrative only. Numerous alternative embodiments may be devised by those skilled in the art without departing from the spirit and scope of the present invention.

We claim:

1. A computer graphics system comprising a main CPU, a main system memory, a graphics subsystem for displaying graphical images on a display terminal, and a system bus for enabling said main CPU, said system memory and said graphics subsystem to transmit data among one another, said graphics subsystem comprising:

a graphics controller in communication with said system bus, a frame buffer for storing pixels displayed on said display terminal, a separate off-screen memory unit located within said graphics subsystem for storing off-screen pixels in a linear format, and a local bus for transmitting data within said graphics subsystem among said frame buffer, said off-screen memory unit, and said graphics controller, said graphics controller including means for converting between two dimensional addresses and linear format addresses utilized by said off-screen memory unit, for converting between logical two dimensional addresses and physical two dimensional addresses and for converting between logical linear addresses and physical linear addresses.

2. The system of claim 1 wherein a block transfer between said off-screen memory unit and said frame buffer is transmitted via said local bus under the control of said graphics controller and wherein said graphics controller performs address conversions required for executing said block transfer.

3. The system of claim 1 wherein said converting means in said graphics controller performs address conversions required to execute graphics commands.

4. The system of claim 1 wherein said address conversion means comprises means for storing a base linear address, means for storing a window width, means for storing a two-dimensional pixel address in terms of an X coordinate and a Y coordinate, means for multiplying the Y coordinate by the window width, for adding the base address thereto, and for temporarily storing the result, and means for adding the temporarily stored result to said X coordinate to obtain a linear address.

5. The system of claim 1 wherein said display terminal displays a first window overlapping a second window and wherein pixels comprising an overlapped portion of said second window are stored in said off-screen memory unit in a linear format.

6. The system of claim 1 wherein said frame buffer utilizes a linear format to store said pixels displayed on said display terminal.

7. The system of claim 6 wherein excess memory capacity in said frame buffer is utilized to store off-screen pixels.

8. The computer graphics system of claim 1 wherein said graphics controller further comprises a plurality of registers for storing X and Y coordinates, base linear addresses and window widths, and wherein said means for converting comprises:

a multiplier connected to at least one of said plurality of registers storing a Y coordinate and to at least one of said registers storing a window width for producing a product thereof, at least one multiplexer for receiving as first inputted values, said product produced by said multiplier, an interim value, said X coordinates and said base linear addresses, said at least one multiplexer for selecting particular ones of said inputted values, an adder for adding together said particular ones of said first inputted values selected by said at least one multiplexer to produce a sum, an intermediate register for storing said sum as said interim value and inputting said interim value to said at least one multiplexer, and an additional multiplexer for receiving as second inputted values, at least one base linear address and said sum, said additional multiplexer for selecting one of said second inputted values as a converted address for accessing said frame buffer and said off-screen memory unit, wherein said additional multiplexer selects one of said second inputted values depending on whether said means for convening converts between a two dimensional address and a linear address, between a two dimensional logical address and a two dimensional physical address, or between a logical linear address and a physical linear address.

9. In a computer graphics system comprising a main CPU, a main system memory, a graphics subsystem for displaying graphical images on a display terminal and a system bus for enabling said main CPU, said main system memory, and said graphics subsystem to communicate, a graphics controller forming part of said graphics subsystem for executing graphics commands and comprising, means for converting between a two-dimensional address in the form of an X coordinate and a Y coordinate and a linear format address, for converting between a two-dimensional logical address and a two-dimensional physical address, and for converting between a logical linear address and a physical linear address so that said address conversions can be carried out by said graphics subsystem instead of said main CPU, said converting means comprising means for storing a base linear address, means for storing a window width, means for storing said X and Y coordinates, means for multiplying the Y coordinate by the window width, for adding the base address thereto and for adding the X coordinate thereto to obtain said linear format address.

10. The graphics controller of claim 8 wherein said graphics subsystem comprises a frame buffer for storing pixels displayed on said display terminal, a separate off-screen memory for storing off-screen pixels in a linear format and a local bus for enabling said graphics controller, said frame buffer and said off-screen memory unit to communicate.

11. A computer graphics system comprising a main CPU, a main system memory, a graphics subsystem for displaying graphical images on a display terminal, and a system bus for enabling said main CPU, said system memory and said graphics subsystem to transmit data among one another, said graphics subsystem comprising a graphics controller in communication with said system bus, a frame buffer for using a linear address format to store pixels displayed on said display terminal, and offscreen memory means for storing offscreen pixels using a linear address format, a local bus for transmitting data within said graphics subsystem among said graphics controller, said frame buffer and said offscreen memory means, said graphics controller including means for converting between two-dimensional addresses and linear addresses, for converting between logical two-dimensional addresses and physical two-dimensional addresses and for converting between logical linear addresses and physical linear addresses.

12. The system of claim 10 wherein said offscreen memory means is located at least in part in said frame buffer.

* * * * *